United States Patent
Li et al.

(10) Patent No.: US 12,261,739 B2
(45) Date of Patent: Mar. 25, 2025

(54) DATA PROCESSING METHOD, DEVICE, AND STORAGE MEDIUM

(71) Applicant: ZTE CORPORATION, Shenzhen (CN)

(72) Inventors: Dapeng Li, Shenzhen (CN); Yin Gao, Shenzhen (CN); Yingjun Zhou, Shenzhen (CN); Zhuang Liu, Shenzhen (CN); Feng Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/249,457

(22) PCT Filed: Mar. 22, 2022

(86) PCT No.: PCT/CN2022/082183
§ 371 (c)(1),
(2) Date: Apr. 18, 2023

(87) PCT Pub. No.: WO2022/199567
PCT Pub. Date: Sep. 29, 2022

(65) Prior Publication Data
US 2023/0388179 A1   Nov. 30, 2023

(30) Foreign Application Priority Data
Mar. 26, 2021 (CN) .......................... 202110328303.6

(51) Int. Cl.
*G06F 7/00* (2006.01)
*G06F 17/00* (2019.01)
(Continued)

(52) U.S. Cl.
CPC ............ *H04L 41/0803* (2013.01); *H04L 9/50* (2022.05)

(58) Field of Classification Search
CPC .............................. H04L 41/0803; H04L 9/50
(Continued)

(56) References Cited

U.S. PATENT DOCUMENTS

2018/0089436 A1*  3/2018  Smith ................... H04L 9/3236
2019/0018984 A1*  1/2019  Setty ..................... H04L 9/3239
(Continued)

FOREIGN PATENT DOCUMENTS

CN         109727655 A        5/2019
CN         110336815 A       10/2019
(Continued)

OTHER PUBLICATIONS

International Search Report in Application No. PCT/CN2022/082183 dated Jun. 10, 2022, 5 pages, including translation.

*Primary Examiner* — Pavan Mamillapalli
(74) *Attorney, Agent, or Firm* — Morgan, Lewis & Bockius LLP

(57) ABSTRACT

Provided are a data processing method and device, and a storage medium. The method includes: receiving configuration information of a blockchain from a second network element, where the configuration information includes: application layer blockchain on-chaining auxiliary information, or application layer blockchain uplink auxiliary information and application layer blockchain configuration information; and putting terminal application layer information on the blockchain according to the application layer blockchain on-chaining auxiliary information.

13 Claims, 11 Drawing Sheets

(51) Int. Cl.
*H04L 9/00* (2022.01)
*H04L 41/0803* (2022.01)

(58) Field of Classification Search
USPC .......................................................... 707/966
See application file for complete search history.

(56) References Cited

U.S. PATENT DOCUMENTS

| | | | |
|---|---|---|---|
| 2019/0034716 A1* | 1/2019 | Kamarol | G06V 10/764 |
| 2019/0044703 A1* | 2/2019 | Smith | G06F 18/22 |
| 2019/0245697 A1* | 8/2019 | El Abed | H04L 9/0618 |
| 2019/0340269 A1* | 11/2019 | Biernat | H04L 63/12 |
| 2019/0349426 A1* | 11/2019 | Smith | H04L 9/3239 |

FOREIGN PATENT DOCUMENTS

| | | |
|---|---|---|
| CN | 110880146 A | 3/2020 |
| CN | 110933040 A | 3/2020 |
| CN | 112383441 A | 2/2021 |
| WO | WO2020233352 A1 | 11/2020 |

\* cited by examiner

DATA PROCESSING METHOD, DEVICE, AND STORAGE MEDIUM

CROSS REFERENCE TO RELATED APPLICATIONS

This is a National Stage Application filed under 35 U.S.C. 371, based on International Patent Application No. PCT/CN2022/082183 filed Mar. 22, 2022, which claims priority to Chinese Patent Application No. 202110328303.6 filed with the China National Intellectual Property Administration (CNIPA) on Mar. 26, 2021, the disclosures of which is are incorporated herein by reference in their entireties.

TECHNICAL FIELD

The present application relates to the field of communications, and in particular, to a data processing method and device, and a storage medium.

BACKGROUND

With the wide application of blockchain, the mainstream operators at home and abroad actively explore the application of blockchain in the communication system and find that the consortium blockchain is the most suitable for the application scenario of operators, and the two mainstream applications are the 5th generation mobile communication technology (5G) edge computing and 5G co-construction and sharing. The distributed nature of blockchain tends to be consistent with the edge computing architecture, and the combination of blockchain and the edge device node is beneficial to the resource complementation and the expansion of new services. In terms of co-construction and sharing, since untrusted multi-party devices are required to participate and cooperate, the blockchain technology may be adopted to achieve trusted data sharing, and the application scenarios involved include roaming settlement, data sharing, resource allocation, operation and maintenance management, and the like. Since a large number of application programs are run on the smart terminal, how to achieve trusted information storage of the terminal application layer information is an urgent problem to be solved.

SUMMARY

In view of the above, embodiments of the present application provide a data processing method and device, and a storage medium, so as to achieve the purpose of putting the terminal application layer information on the blockchain in the radio access network.

The embodiments of the present application provide a data processing method. The method is applied by a first network element and includes the following.

Configuration information of a blockchain is received from a second network element, where the configuration information includes: application layer blockchain on-chaining auxiliary information, or application layer blockchain on-chaining auxiliary information and application layer blockchain configuration information.

Terminal application layer information is put on the blockchain according to the application layer blockchain on-chaining auxiliary information.

The embodiments of the present application provide a data processing method. The method is applied by a second network element and includes the following.

Configuration information of a blockchain is sent to a first network element, where the configuration information includes: application layer blockchain on-chaining auxiliary information, or application layer blockchain on-chaining auxiliary information and application layer blockchain configuration information.

The embodiments of the present application provide a data processing apparatus. The apparatus is applied in a first network element and includes a receiver and an on-chaining module.

The receiver is configured to receive configuration information of a blockchain from a second network element, where the configuration information includes: application layer blockchain on-chaining auxiliary information, or application layer blockchain on-chaining auxiliary information and application layer blockchain configuration information.

The on-chaining module is configured to put terminal application layer information on the blockchain according to the application layer blockchain on-chaining auxiliary information.

The embodiments of the present application provide a data processing apparatus. The apparatus is applied by a second network element and includes the following.

The sender is configured to send configuration information of a blockchain to a first network element, where the configuration information includes: application layer blockchain on-chaining auxiliary information, or application layer blockchain on-chaining auxiliary information and application layer blockchain configuration information.

The embodiments of the present application provide a data processing device. The device includes a communication module, a memory, and one or more processors.

The communication module is configured to perform communication interaction among a plurality of nodes.

The memory is configured to store one or more programs.

The one or more programs, when executed by the one or more processors, enable the one or more processors to implement the method of any one of the preceding embodiments.

The embodiments of the present application provide a storage medium. The storage medium is configured to store a computer program, and the computer program, when executed by a processor, implements the method of any one of the preceding embodiments.

DETAILED DESCRIPTION

Figure 1:
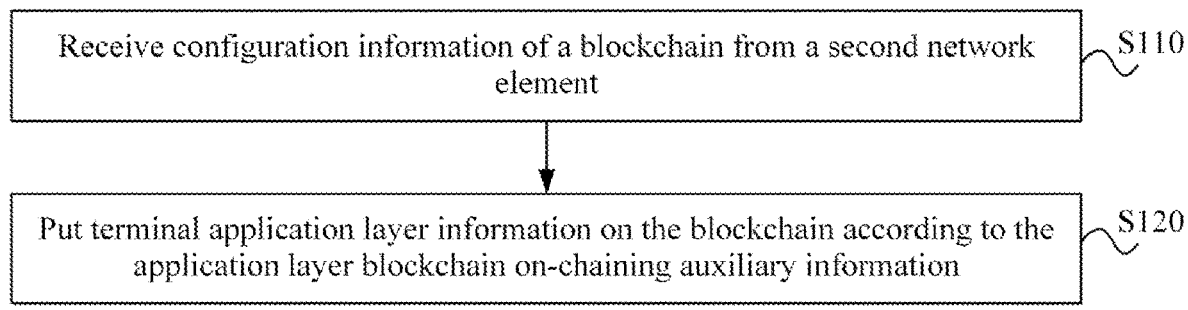
FIG. 1 is a flowchart of a data processing method according to an embodiment of the present application.

The embodiments of the present application are described below in conjunction with drawings. The present application will be described in conjunction with the drawings of embodiments, and the embodiments described hereinafter are intended to explain the present application and not to limit the scope of the present application.

A blockchain is a distributed ledger technology originated from Bitcoin and has various advantages such as great safety, transparency and unmodifiability. Such a technology stores data through a block-chain structure and achieves the update and synchronization of data using a node consensus mechanism. The consensus mechanism is the core part of blockchain technology and can enable distributed nodes who distrust each other to reach a consensus on certain information. The main process of the consensus mechanism is that when a new block is added, some nodes are required to keep accounts and other nodes are required to perform verification, and when the verification passes, it means that the nodes reach a consensus, so as to achieve trusted data storage. On this basis, the encryption technology is used to ensure that the data on the blockchain cannot be forged and tampered with. A smart contract is a segment of program codes recorded on the blockchain. Through the smart contract, the data stored on the blockchain can be automatically operated, thereby ensuring the strict implementation of an established rule. The blockchain can be divided into three categories, including public blockchains, consortium blockchains, and private blockchains. Participants of the public blockchain include all people, and any user may read and write data, conduct transactions and confirm consensus. The consortium blockchain only allows members of the consortium to participate, the member institutions run one or more nodes, and the read and write of data and the transaction permission are executed according to the rules of the consortium. The write permission in the private blockchain is only in the hands of one organization, and thus the private blockchain is generally applied within the enterprise.

The distributed ledger technology is applied to data traceability, especially in the field of product data traceability. When the distributed ledger technology is used for product data traceability, the product data may be shared, copied and synchronized among network member nodes. One network member node stores the generated product data in a distributed ledger and synchronizes the product data with other network member nodes so that other network member nodes that have the permission may read the product data, ensuring the uniqueness and tamper resistance of the data.

The distributed ledger technology is based on the blockchain structure. The blockchain is formed by connecting the composed blocks through a chain structure, and each block includes generation time, a current block root hash value, a previous block root hash value, and contained records. In the blockchain-based information traceability system, the information to be traced is added to the blockchain in sequence. When the information is added to the blockchain, a unique identity (ID) of the information is generated. In the traceability information inquiry, the traceability information is inquired in the blockchain, and the uniqueness of the ID of the product is confirmed. Each blockchain participant holds all blockchains, and new information added by any participant is synchronized to blockchains held by other participants. Similarly, a participant may view the information added by other participants in the blockchain to achieve traceability.

In recent years, the blockchain technology has been gradually applied to various fields of industry, and the application of blockchain in the communication system is an emerging trend.

The radio access network includes base stations and terminals. The base station belongs to the node of the radio access network and serves a large number of terminals within the radio signal range through a radio interface protocol. Operators may independently construct a blockchain server, or multiple operators may co-construct and share blockchain services in a consortium fashion. The information of the access stratum (AS) layer and non-AS layer of the base station and terminal may be stored as trusted information through blockchain on-chaining to prevent data and information from being tampered with.

A large number of software applications run on the smart terminal, and these applications are provided by third parties other than operators. In a case where the software information on the smart terminal requires on-chaining service, how to achieve blockchain on-chaining of terminal application layer information using the radio access network is an urgent problem to be solved.

In view of the above, the embodiments of the present application provide a data processing method, so as to achieve the blockchain on-chaining of the terminal application layer information in the radio access network in a communication system, thereby achieving the storage of trusted information in the moving scenario.

In an embodiment, FIG. 1 is a flowchart of a data processing method according to an embodiment of the present application. This embodiment may be executed by a first network element. The first network element may be a base station, a blockchain service trigger server, a core network element, and the like. In this embodiment, the process of blockchain on-chaining of terminal application layer information is described below using an example where the first network element is a base station. As shown in FIG. 1, the data processing method provided in this embodiment includes S110 and S120.

In S110, configuration information of a blockchain is received from a second network element.

The configuration information includes: application layer blockchain on-chaining auxiliary information, or application layer blockchain on-chaining auxiliary information and application layer blockchain configuration information.

In S120, terminal application layer information is put on the blockchain according to the application layer blockchain on-chaining auxiliary information.

In an embodiment, the second network element may include one of the following: a blockchain service trigger server, a core network element, and a base station. In the actual communication process, the first network element and the second network element are not the same network element. For example, in the case where the first network element is a base station, the second network element is not a base station. In an embodiment, the terminal application layer information refers to measurement data information, that is, terminal application information required to be measured. After the first network element receives the configuration information of the blockchain from the second network element, the first network element collects the application layer information of the terminal according to the application layer blockchain on-chaining auxiliary information to obtain the terminal application layer information and puts the terminal application layer information on the blockchain, so as to achieve the purpose of putting the terminal application layer information on the blockchain in the radio access network in the process where the terminal moves, thereby achieving the purpose of the storage of trusted information in the moving scenario. The terminal application layer information may be collected by the first network element, and may also be actively reported to the first network element by the terminal, but the present application is not limited thereto.

In an embodiment, the data processing method applied by the first network element further includes the following.

An information on-chaining success indication is generated.

The information on-chaining success indication is sent to a server that initiates a blockchain on-chaining session or a node that initiates a blockchain on-chaining session.

In an embodiment, after the first network element successfully completes the blockchain on-chaining on the terminal application layer information, the first network element generates the corresponding information on-chaining success indication information and sends the information on-chaining success indication to the server that initiates the blockchain on-chaining session or the node that initiates the blockchain on-chaining session. The server that initiates the blockchain on-chaining session may be a blockchain service trigger server, and may also be a third-party server.

In an embodiment, the data processing method applied by the first network element further includes the following: the application layer blockchain configuration information is sent to a terminal application layer.

In an embodiment, the second network element includes one of the following: a blockchain service trigger server, a core network element, and a base station.

In an embodiment, the application layer blockchain configuration information is defined by a third-party server.

In an embodiment, the application layer blockchain on-chaining auxiliary information includes one or a combination of the following parameters:
- a blockchain application identity;
- a terminal application blockchain reporting range;
- a blockchain on-chaining session identity;
- a blockchain on-chaining format;
- a blockchain server Internet Protocol (IP) address list and/or a blockchain node list;
- a correspondence between a blockchain server device identity or blockchain server address and on-chaining information;
- a server IP address that initiates a blockchain on-chaining session or a node that initiates the blockchain on-chaining session;
- an activation indication;
- a stop indication;
- a suspend indication;
- a recovery indication;
- an idle state indication; and
- terminal identification information. In an embodiment, the blockchain application identity may include an application type and/or an application name. The idle state indication may be understood as an on-chaining indication. The terminal identification information is only used for distinguishing different users and does not contain any private information.

In an embodiment, the terminal application blockchain reporting range includes one or a combination of the following parameters: a cell list, a tracking area (TA) list, a tracking area identity (TAI) list, a network slicing list, and a radio access technology (RAT) type. In an embodiment, the RAT type is related to the communication technology, for example, if the communications technology is the 4th generation mobile communication technology (4G), the RAT type is Long Term Evolution (LTE), and if the communication technology is 5G, the RAT type is New Radio (NR).

In an embodiment, the blockchain on-chaining format includes one or a combination of the following parameters: an information on-chaining frequency, an on-chaining information format, an on-chaining block size, and an on-chaining encryption key. In an embodiment, the information on-chaining frequency may include one of the following: periodical on-chaining and event-triggered on-chaining. The event-triggered on-chaining refers to blockchain on-chaining of on-chaining information when a specified event is triggered. In an embodiment, the on-chaining information format includes one of the following: American Standard Code for Information Interchange (ASCII), binary, a file, and a data structure.

Figure 2:
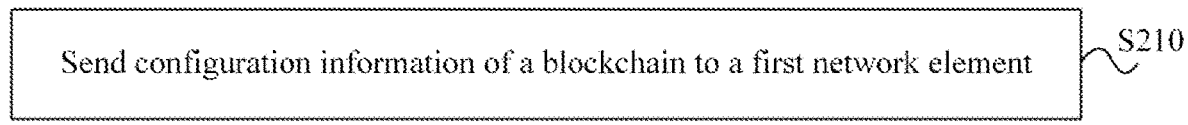
FIG. 2 is a flowchart of another data processing method according to an embodiment of the present application.

In an embodiment, FIG. 2 is a flowchart of another data processing method according to an embodiment of the present application. This embodiment may be executed by a second network element. The second network element may include one of the following: a blockchain service trigger server, a core network element, and a base station. In this embodiment, the process of data processing is described below using an example where the second network element is a blockchain service trigger server. As shown in FIG. 2, the data processing method provided in this embodiment includes S210.

In S210, configuration information of a blockchain is sent to a first network element.

The configuration information includes: application layer blockchain on-chaining auxiliary information, or application layer blockchain on-chaining auxiliary information and application layer blockchain configuration information. The second network element sends the received or pre-configured configuration information of the blockchain to the first network element so that the first network element puts the terminal application layer information on the blockchain according to the application layer blockchain on-chaining auxiliary information, so as to achieve the purpose of putting the terminal application layer information on the blockchain in the access network, thereby achieving the storage of trusted information in the moving scenario.

In an embodiment, the application layer blockchain on-chaining auxiliary information includes one or a combination of the following parameters: a blockchain application identity; a terminal application blockchain reporting range; a blockchain on-chaining session identity; a blockchain on-chaining format; a blockchain server IP address list and/or a blockchain node list; a correspondence between a blockchain server device identity or blockchain server address and on-chaining information; a server IP address that initiates a blockchain on-chaining session or a node that initiates the blockchain on-chaining session; an activation indication; a stop indication; a suspend indication; a recovery indication; an idle state indication; and terminal identification information.

In this embodiment, for the explanation of the parameters in the configuration information, reference may be made to the description in the preceding embodiments, and details will not be repeated here.

Figure 3:
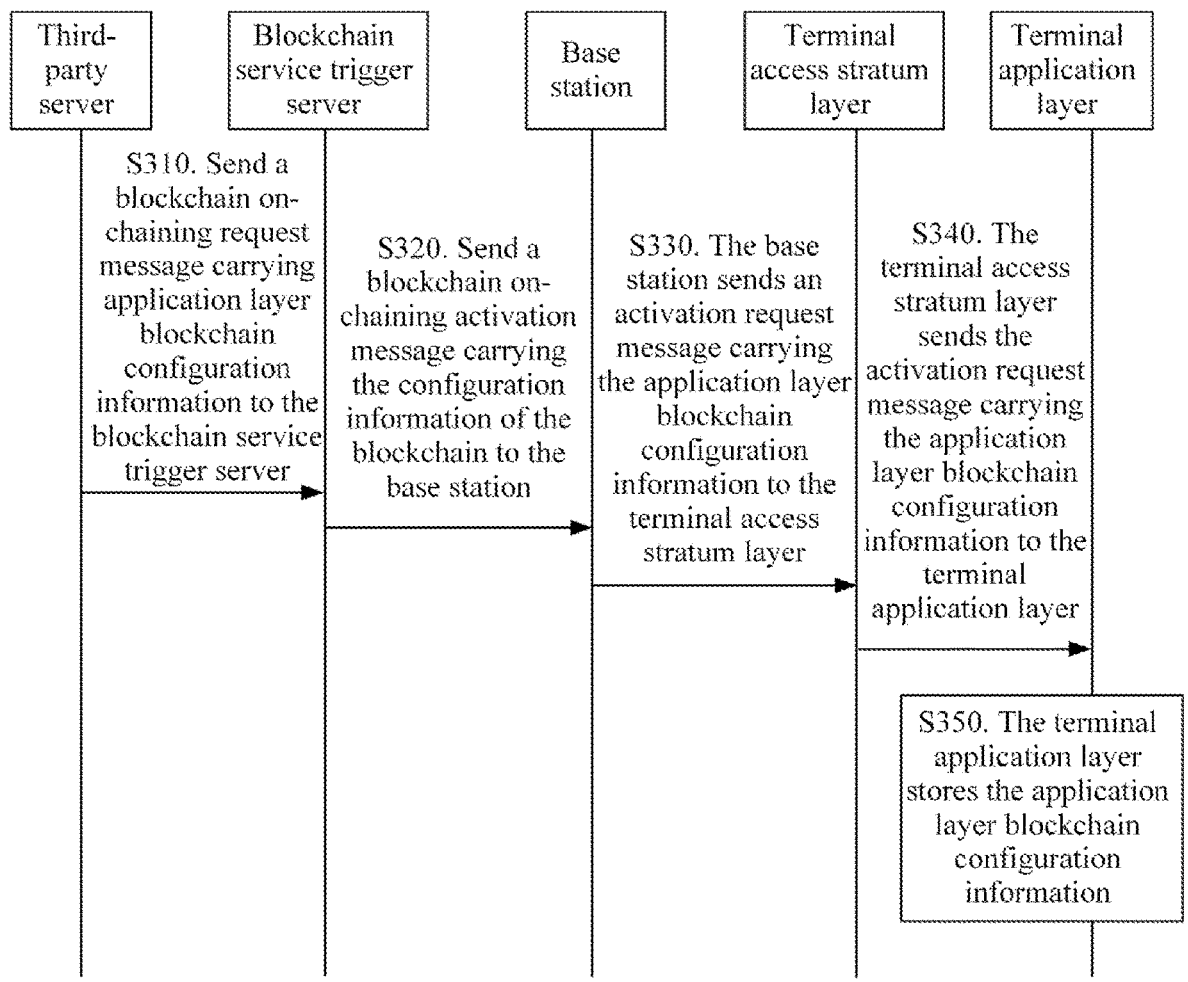
FIG. 3 is a flowchart of blockchain on-chaining activation of terminal application layer information according to an embodiment of the present application.

In an embodiment, FIG. 3 is a flowchart of blockchain on-chaining activation of terminal application layer information according to an embodiment of the present application. In this embodiment, the process of blockchain on-chaining activation of terminal application layer information is described below using an example where the first network element is a base station and the second network element is a blockchain service trigger server. As shown in FIG. 3, this embodiment includes S310 to S350.

In S310, a blockchain on-chaining request message carrying application layer blockchain configuration information is sent to the blockchain service trigger server.

In an embodiment, a third-party server sends the blockchain on-chaining request message carrying the application layer blockchain configuration information to the blockchain service trigger server. The third-party server refers to the server operated by non-operators. For example, the third-party server may be a server providing third-party services such as positioning and finance. In an embodiment, through the network of the mobile operator, the third-party server may put the service information of the third-party service client running on the terminal on the blockchain provided by the operator. The operator refers to the provider that provides network services, such as China Mobile, China Unicom and China Telecom.

In an embodiment, through an interface provided by the operator, the third-party server sends the blockchain on-chaining request message to the blockchain service trigger server provided by the operator. The blockchain on-chaining request message includes one or more of the following information: application layer blockchain configuration information, a terminal identity, on-chaining range information, and a transaction identity.

The application layer blockchain configuration information includes: a service type defined by the third party, the definition of information that needs to be put on the blockchain, and an on-chaining trigger condition. For example, the on-chaining trigger condition may be a trigger condition such as deposit and withdrawal. In an embodiment, the terminal identity is used for distinguishing different terminals, the dimension of the on-chaining range information may include an operator identity or an actual geographical location, and the transaction identity is used for distinguishing different requests.

In an embodiment, in the operator network, the blockchain service trigger server may be a network management system, mobile edge computing (MEC) device, and other device.

In S320, a blockchain on-chaining activation message carrying the configuration information of the blockchain is sent to the base station.

In an embodiment, the blockchain on-chaining activation message may be directly sent from the blockchain service trigger server to the base station, or an interface message may be sent to the base station through a core network element. The blockchain service trigger server may be a network management system, an edge server, and other devices. The interface message may be a message of an interface such as an NG interface, an S1 interface and the like.

In an embodiment, the blockchain service trigger server receives the blockchain on-chaining request message from the third-party server and generates the configuration information of the blockchain. The configuration information includes application layer blockchain configuration information and application layer blockchain on-chaining auxiliary information. In an embodiment, the application layer blockchain configuration information is generated by the third-party server in S310. It is to be understood that when the third-party server is a server of a different third-party service, the application layer blockchain configuration information is also different. The application layer blockchain configuration information is transparent to the blockchain service trigger server, that is, the blockchain service trigger server may directly send the application layer blockchain configuration information to the next network node without unlocking the application layer blockchain configuration information. In an embodiment, the application layer blockchain on-chaining auxiliary information is the configuration information required for the radio access network to complete the on-chaining of terminal application layer information.

In an embodiment, the application layer blockchain on-chaining auxiliary information includes one or a combination of the following parameters: a blockchain application identity (for example, including an application type and an application name); a terminal application blockchain reporting range; a blockchain on-chaining session identity; a blockchain on-chaining format; a blockchain server IP address list and/or a blockchain node list; a correspondence between a blockchain server device identity or blockchain server address and on-chaining information; a server IP address that initiates a blockchain on-chaining session or a node that initiates the blockchain on-chaining session; and terminal identification information. In an embodiment, the terminal application blockchain reporting range includes one or a combination of the following: a cell list, a TA list, a TAI list, a network slicing list, and a RAT type (such as LTE and NR). In an embodiment, the blockchain on-chaining format includes one or a combination of the following: an information on-chaining frequency (such as periodical on-chaining and event-triggered on-chaining), an on-chaining information format (such as ASCII, binary, a file or a data structure), an on-chaining block size, and an on-chaining encryption key.

In S330, the base station sends an activation request message carrying the application layer blockchain configuration information to the terminal AS layer.

The activation request message may use an air interface radio resource control (RRC) message to carry the application layer blockchain configuration information. Of course, the activation request message also includes part of the application layer blockchain on-chaining auxiliary information. For example, the activation request message includes a blockchain on-chaining session identity and a terminal application blockchain reporting range.

In S340, the terminal AS layer sends the activation request message carrying the application layer blockchain configuration information to the terminal application layer.

In an embodiment, after the terminal AS layer receives the application layer blockchain on-chaining auxiliary information, the terminal AS layer stores the application layer blockchain on-chaining auxiliary information. The activation request message may use an attention (AT) command, and the activation request message may carry the application layer blockchain configuration information and part of the application layer blockchain on-chaining auxiliary information. The application layer blockchain on-chaining auxiliary information may include a blockchain on-chaining session identity, a terminal application blockchain reporting range, and an on-chaining encryption key.

In S350, the terminal application layer stores the application layer blockchain configuration information.

The application layer blockchain configuration information is provided by the third-party server, so the application layer may parse the configuration content such as the on-chaining trigger condition.

In an embodiment, the terminal application layer stores the application layer blockchain on-chaining auxiliary information while storing the application layer blockchain configuration information. For example, the terminal application layer may store the blockchain on-chaining session identity in the application layer blockchain on-chaining auxiliary information, where the blockchain on-chaining session identity is used for distinguishing different on-chaining sessions. For example, the terminal application layer may also store the terminal application blockchain reporting range in the application layer blockchain on-chaining auxiliary information, where the terminal application blockchain reporting range is used for the terminal identification to perform the on-chaining operation in a licensed area.

In an embodiment, after the terminal application layer stores the configuration information, the terminal application layer starts the on-chaining operation and waits for the trigger of the data acquisition and data on-chaining when a configuration event occurs.

For example, the application layer blockchain configuration information provided by the third-party server defines the detailed trigger conditions for deposit and withdrawal operations of financial services. The terminal application layer stores the application layer blockchain configuration information and part of the application layer blockchain on-chaining auxiliary information and starts detecting the terminal application layer information. When a user performs the deposit and withdrawal operations of financial services, the terminal application layer starts data collection and puts the terminal application layer information on the blockchain according to the configuration.

Figure 4:
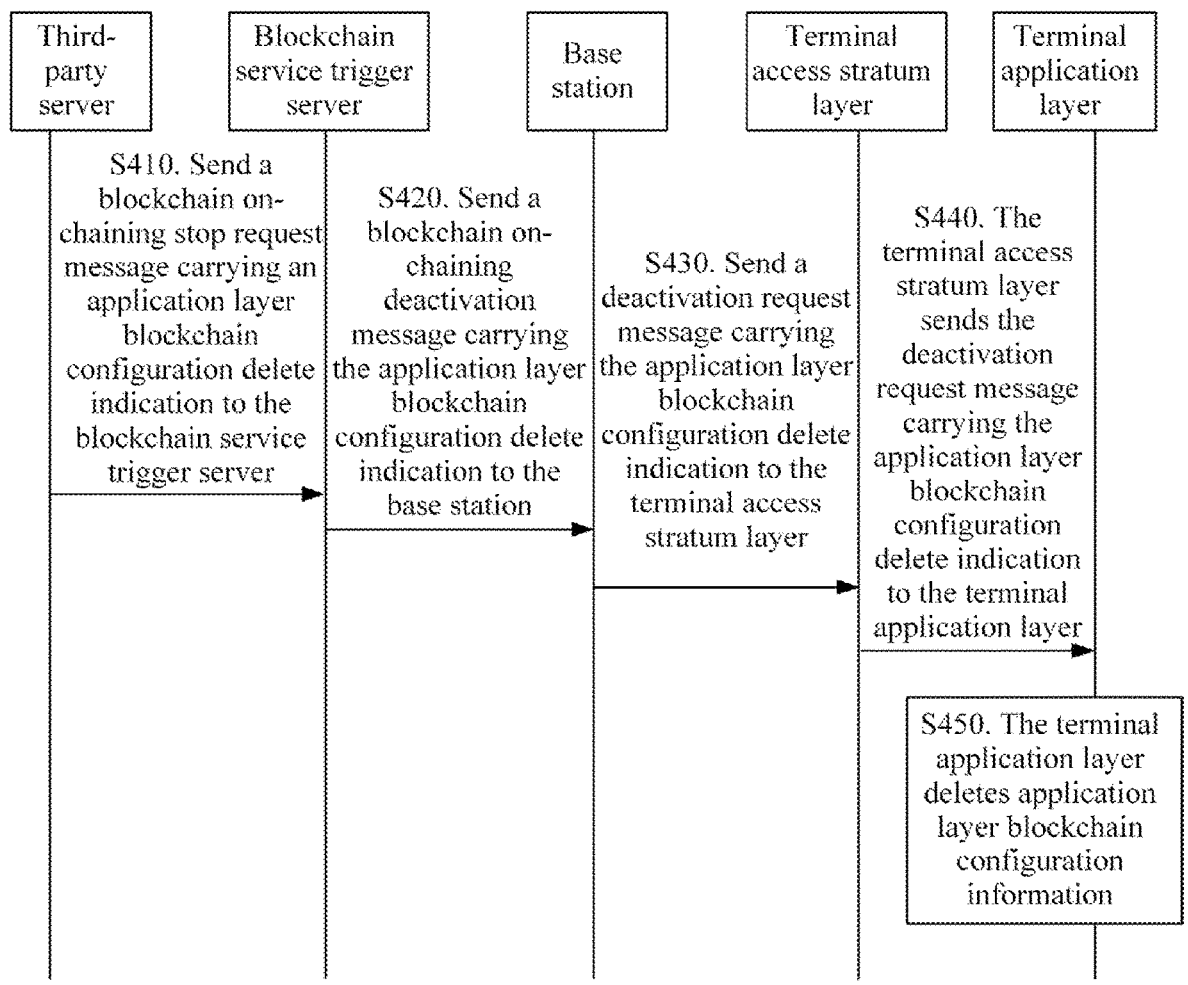
FIG. 4 is a flowchart of blockchain on-chaining deactivation of terminal application layer information according to an embodiment of the present application.

In an embodiment, FIG. 4 is a flowchart of blockchain on-chaining deactivation of terminal application layer information according to an embodiment of the present application. In this embodiment, the process of blockchain on-chaining deactivation of terminal application layer information is described below using an example where the first network element is a base station and the second network element is a blockchain service trigger server. As shown in FIG. 4, this embodiment includes S410 to S450.

In S410, a blockchain on-chaining stop request carrying an application layer blockchain configuration delete indication is sent to the blockchain service trigger server.

In an embodiment, a third-party server sends the blockchain on-chaining stop request message to the blockchain service trigger server and carries the application layer blockchain configuration delete indication in the blockchain on-chaining stop request message. In an embodiment, through an interface provided by the operator, the third-party server sends the blockchain on-chaining stop request message to the blockchain service trigger server provided by the operator. In an embodiment, the blockchain on-chaining stop request message includes one or a combination of the following: a terminal identity, a transaction identity, and a stop indication. In an embodiment, the terminal identity is used for distinguishing different terminals, and the transaction identity is used for distinguishing different requests.

In S420, a blockchain on-chaining deactivation message carrying the application layer blockchain configuration delete indication is sent to the base station.

In an embodiment, the blockchain on-chaining deactivation message may be directly sent from the blockchain service trigger server to the base station, or an interface message may be sent to the base station through a core network element. The blockchain service trigger server may be a network management system, an edge server, and other devices. The interface message may be a message of an interface such as an NG interface, an S1 interface and the like.

In an embodiment, the blockchain service trigger server may directly send the blockchain on-chaining deactivation message carrying the application layer blockchain configuration delete indication to the base station, that is, the blockchain service trigger server may also directly triggers the blockchain on-chaining deactivation message without executing S410.

The application layer blockchain configuration delete indication includes one or a combination of the following parameters: a blockchain application identity (including an application type and an application name), a blockchain on-chaining session identity, and a stop indication.

In S430, a deactivation request message carrying the application layer blockchain configuration delete indication is sent to the terminal AS layer.

The deactivation request message is sent through an air interface RRC message. After the terminal AS layer receives the deactivation request message carrying the application layer blockchain configuration delete indication, the terminal AS layer deletes stored records.

In S440, the terminal AS layer sends the deactivation request message carrying the application layer blockchain configuration delete indication to the terminal application layer.

The deactivation request message maybe sent through an AT command.

In S450, the terminal application layer deletes application layer blockchain configuration information.

In an embodiment, the terminal application layer deletes the configuration information corresponding to a deactivated session and stops the on-chaining of the corresponding session data (that is, the terminal application layer information).

Figure 5:
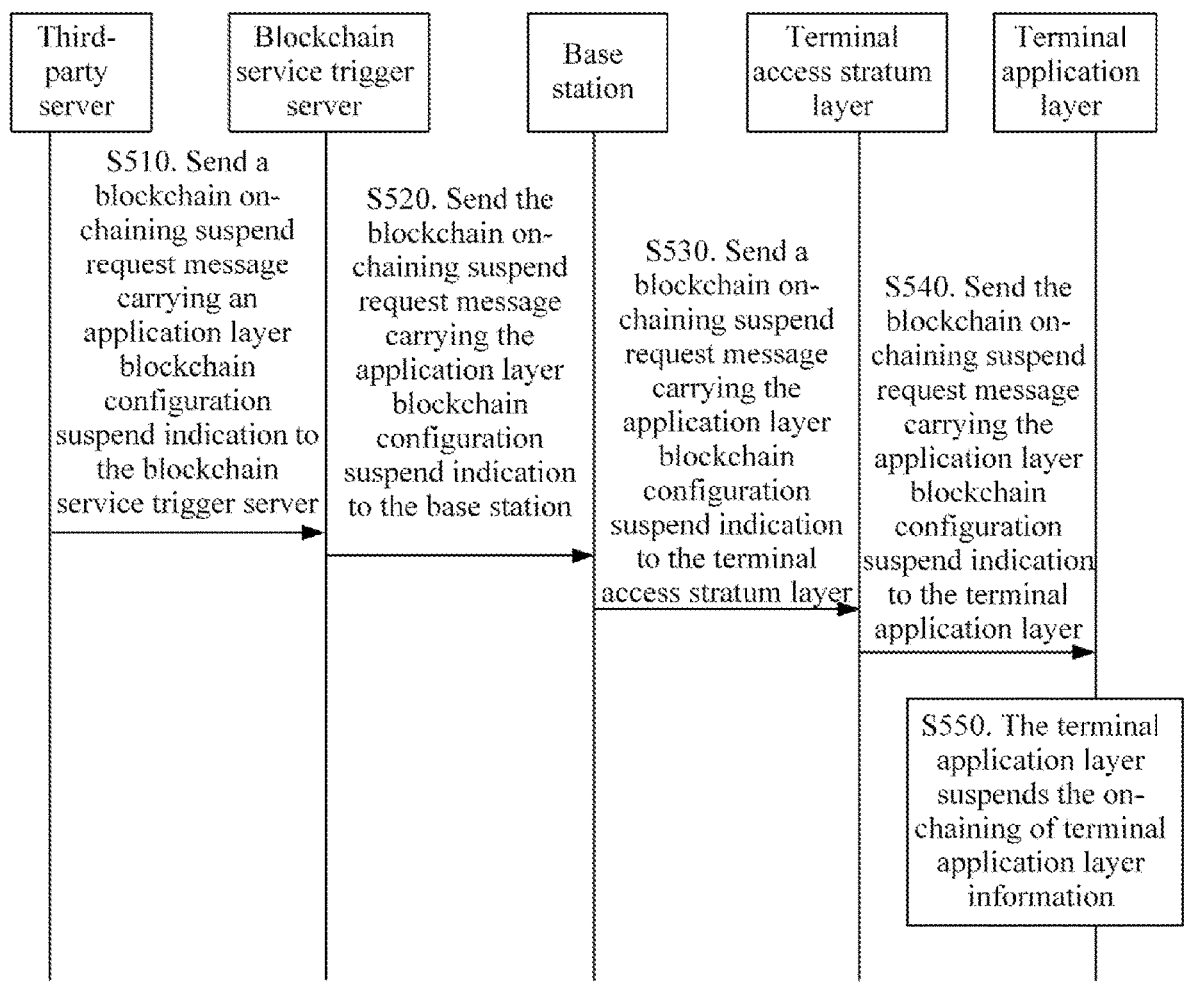
FIG. 5 is a flowchart of blockchain on-chaining suspend of terminal application layer information according to an embodiment of the present application.

In an embodiment, FIG. 5 is a flowchart of blockchain on-chaining suspend of terminal application layer information according to an embodiment of the present application. In this embodiment, the process of blockchain on-chaining suspend of terminal application layer information is described below using an example where the first network element is a base station and the second network element is a blockchain service trigger server. As shown in FIG. 5, this embodiment includes S510 to S550.

In S510, the blockchain on-chaining suspend request message carrying an application layer blockchain configuration suspend indication is sent to the blockchain service trigger server.

Through an interface provided by the operator, the third-party server sends the blockchain on-chaining suspend request message to the blockchain service trigger server provided by the operator. The blockchain on-chaining suspend request message includes one or a combination of the following: a terminal identity, a transaction identity, and a suspend indication. In an embodiment, the terminal identity is used for distinguishing different terminals, and the transaction identity is used for distinguishing different requests.

In S520, the blockchain on-chaining suspend request message carrying the application layer blockchain configuration suspend indication is sent to the base station.

In an embodiment, the blockchain on-chaining suspend request message may be directly sent from the blockchain service trigger server to the base station, or an interface message may be sent to the base station through a core network element. The blockchain service trigger server may be a network management system, an edge server, and other devices. The interface message may be a message of an interface such as an NG interface, an S1 interface and the like.

In an embodiment, the blockchain service trigger server may directly send the blockchain on-chaining suspend request message to the base station, that is, the blockchain service trigger server may also directly triggers the blockchain on-chaining suspend request message without executing S510.

The application layer blockchain configuration suspend indication includes one or a combination of the following parameters: a blockchain application identity (including an application type and an application name), a blockchain on-chaining session identity, and a suspend indication.

In S530, a blockchain on-chaining suspend request message carrying the application layer blockchain configuration suspend indication is sent to the terminal AS layer.

In an embodiment, the blockchain on-chaining suspend request message is sent through an air interface RRC message. The terminal AS layer may transparently deliver the blockchain on-chaining suspend request message to a terminal application layer.

In S540, the blockchain on-chaining suspend request message carrying the application layer blockchain configuration suspend indication is sent to the terminal application layer.

In an embodiment, the blockchain on-chaining suspend request message may be sent through use an AT command.

In S550, the terminal application layer suspends the on-chaining of terminal application layer information.

In an embodiment, the terminal application layer continues to store the previously received application layer blockchain configuration information, and meanwhile, the terminal application layer stops the on-chaining of the terminal application layer information.

Figure 6:
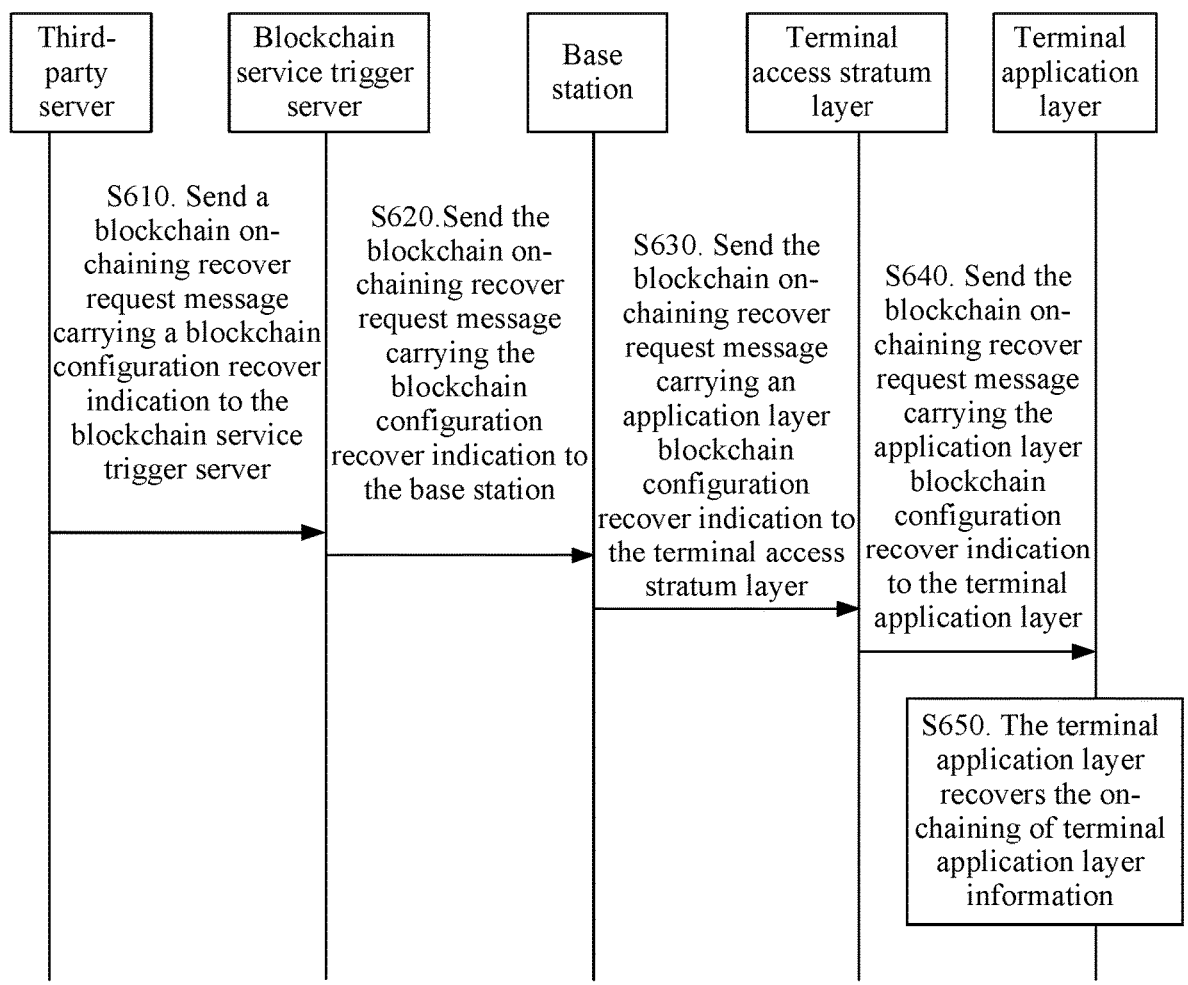
FIG. 6 is a flowchart of blockchain on-chaining recovery of terminal application layer information according to an embodiment of the present application.

In an embodiment, FIG. 6 is a flowchart of blockchain on-chaining recovery of terminal application layer information according to an embodiment of the present application. In this embodiment, the process of blockchain on-chaining recovery of terminal application layer information is described below using an example where the first network element is a base station and the second network element is a blockchain service trigger server. As shown in FIG. 6, this embodiment includes S610 to S650.

In S610, a blockchain on-chaining recover request message carrying a blockchain configuration recover indication is sent to the blockchain service trigger server.

In an embodiment, through an interface provided by the operator, the third-party server sends the blockchain on-chaining recover request message to the blockchain service trigger server provided by the operator. The blockchain on-chaining recover request message includes one or a combination of the following: a terminal identity, a transaction identity, and a recover indication. In an embodiment, the terminal identity is used for distinguishing different terminals, and the transaction identity is used for distinguishing different requests.

In S620, the blockchain on-chaining recover request message carrying the blockchain configuration recover indication is sent to the base station.

In an embodiment, the blockchain on-chaining recover request message may be directly sent from the blockchain service trigger server to the base station, or an interface message may be sent to the base station through a core network element. The blockchain service trigger server may be a network management system, an edge server, and other devices. The interface message may be a message of an interface such as an NG interface, an S1 interface and the like.

In an embodiment, the blockchain service trigger server may directly send the blockchain on-chaining recover request message to the base station, that is, the blockchain service trigger server may also directly triggers the blockchain on-chaining recover request message without executing S610.

The blockchain configuration recover indication includes one or a combination of the following parameters: a blockchain application identity (including an application type and an application name), a blockchain on-chaining session identity, and a recover indication.

In S630, the blockchain on-chaining recover request message carrying an application layer blockchain configuration recover indication is sent to the terminal AS layer.

In an embodiment, the blockchain on-chaining recover request message is sent through an air interface RRC message. The terminal AS layer may transparently deliver the blockchain on-chaining recover request message to a terminal application layer.

In S640, the blockchain on-chaining recover request message carrying the application layer blockchain configuration recover indication is sent to the terminal application layer.

In an embodiment, the blockchain on-chaining recover request message may be sent through an AT command.

In S650, the terminal application layer recovers the on-chaining of terminal application layer information.

In an embodiment, after the terminal application layer receives the blockchain on-chaining recover request message carrying the application layer blockchain configuration recover indication, the terminal application layer recovers the on-chaining of the terminal application layer information.

Figure 7:
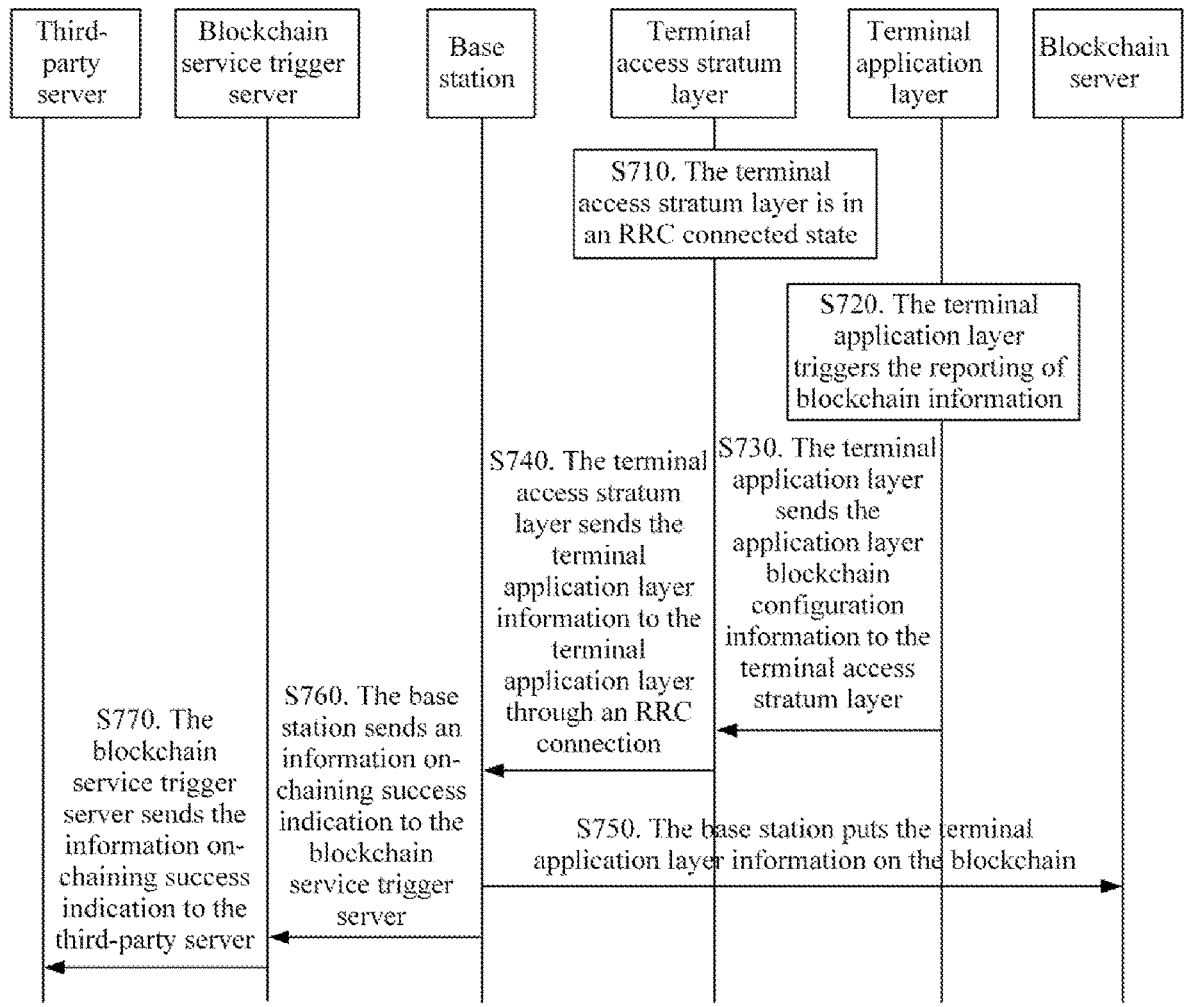
FIG. 7 is a flowchart of on-chaining of terminal application layer information when the terminal is in an RRC connected state according to an embodiment of the present application.

In an embodiment, FIG. 7 is a flowchart of on-chaining of terminal application layer information when the terminal is in an RRC connected state according to an embodiment of the present application. In this embodiment, the process of blockchain on-chaining of terminal application layer information is described below using an example where the first network element is a base station and the second network element is a blockchain service trigger server. As shown in FIG. 7, this embodiment includes S710 to S770.

In S710, the terminal AS layer is in an RRC connected state.

In an embodiment, before S710, a terminal application layer stores application layer blockchain on-chaining auxiliary information, for example, the application layer blockchain on-chaining auxiliary information includes a blockchain on-chaining session identity and a terminal application layer blockchain reporting range. The terminal application layer stores application layer blockchain configuration information.

In S720, the terminal application layer triggers the reporting of blockchain information.

The blockchain information refers to the triggered terminal application layer information. When the trigger condition of the application layer blockchain configuration information is satisfied, the terminal application layer collects the terminal application layer information and triggers the reporting of the terminal application layer information.

If the application layer blockchain on-chaining auxiliary information stored by the terminal application layer before S710 contains an on-chaining encryption key, the terminal application layer encrypts the terminal application layer information and then reports the terminal application layer information.

In S730, the terminal application layer sends the application layer blockchain configuration information to the terminal AS layer.

In an embodiment, the terminal application layer information may be sent to the terminal AS layer through an AT command or a user plane connection.

In S740, the terminal AS layer sends the terminal application layer information to the terminal application layer through an RRC connection.

In an embodiment, since the terminal is in the RRC connected state, the terminal application layer may send on-chaining data (that is, the terminal application layer information) to the base station through the RRC connection. The terminal application layer may directly send the terminal application layer information to the base station through an RRC control command, and the terminal application layer may also indicate to the base station that the terminal has data (that is, the terminal application layer information) that needs to be put on the blockchain through one or several bits. After the base station receives the indication, the base station acquires the terminal application layer information through a user equipment (UE) information request flow. The terminal application layer may also deliver the terminal application layer information to the base station through a user plane.

In S750, the base station puts the terminal application layer information on the blockchain.

In an embodiment, since the terminal is in the RRC connected state, the base station stores user context of the terminal, and the context contains the application layer blockchain on-chaining auxiliary information. Therefore, the base station sends the data to a blockchain server according to the configuration information of the application layer blockchain on-chaining auxiliary information.

In S760, the base station sends an information on-chaining success indication to the blockchain service trigger server.

In an embodiment, after the on-chaining of the terminal application layer information succeeds, the base station may send the information on-chaining success indication to the blockchain service trigger server.

In S770, the blockchain service trigger server sends the information on-chaining success indication to the third-party server.

In an embodiment, after the third-party server receives the information on-chaining success indication, the third-party server may confirm that the operation of the terminal application has been put on the blockchain.

Figure 8:
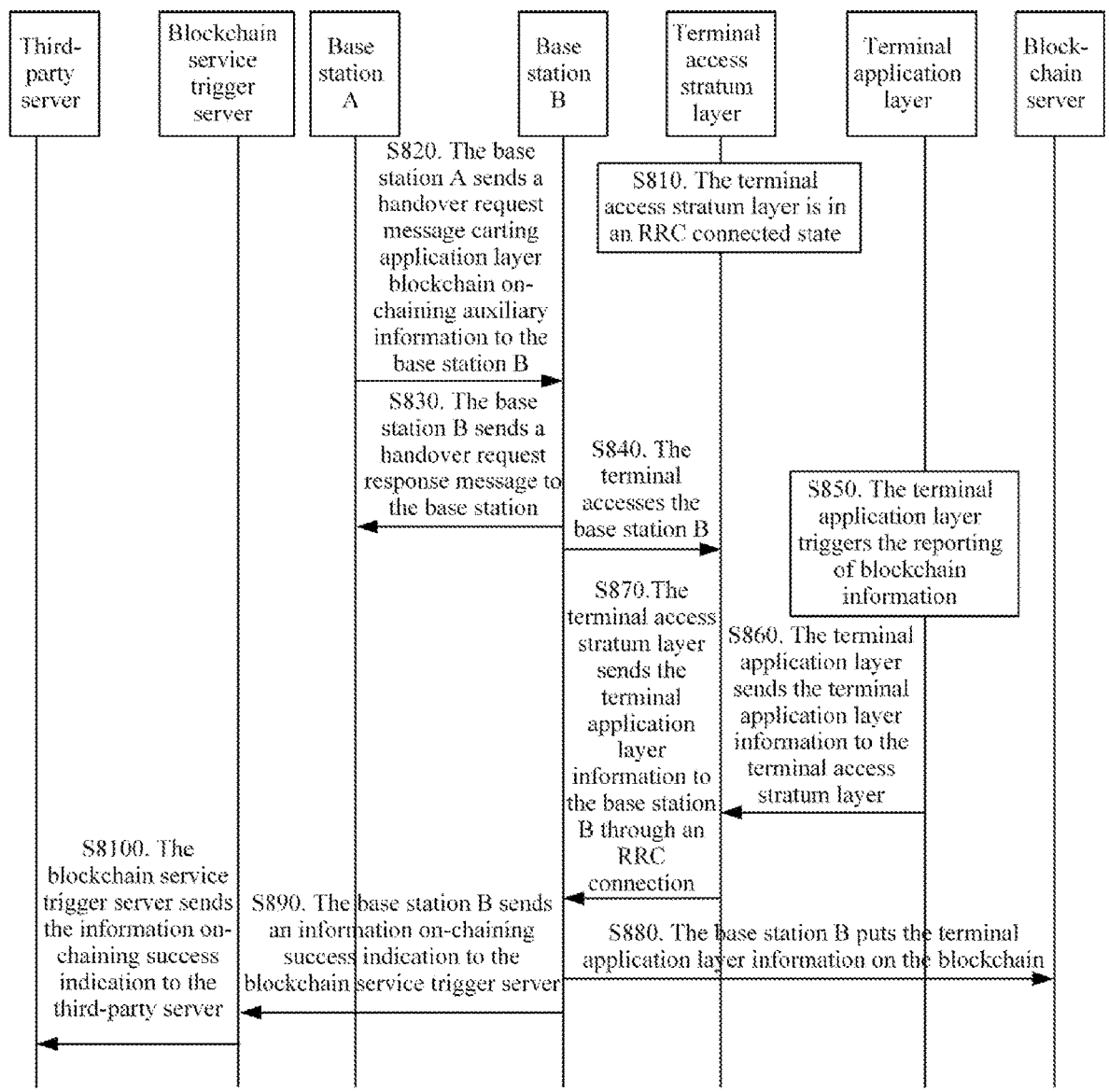
FIG. 8 is a flowchart of on-chaining continuity of terminal application layer information when the terminal in an RRC connected state moves according to an embodiment of the present application.

In an embodiment, FIG. 8 is a flowchart of on-chaining continuity of terminal application layer information when the terminal in an RRC connected state moves according to an embodiment of the present application. In this embodiment, the process of blockchain on-chaining of terminal application layer information is described below using an example where the first network element is a base station and the second network element is a blockchain service trigger server. As shown in FIG. 8, this embodiment includes S810 to S8100.

In S810, the terminal AS layer is in an RRC connected state.

In an embodiment, before S810, the terminal AS layer stores application layer blockchain on-chaining auxiliary information, for example, the application layer blockchain on-chaining auxiliary information includes a blockchain on-chaining session identity and a terminal application layer blockchain reporting range. The terminal application layer stores application layer blockchain configuration information.

The terminal maintains the RRC connection with a base station A at this point.

In S820, the base station A sends a handover request message carting application layer blockchain on-chaining auxiliary information to the base station B.

In an embodiment, the base station A determines that the terminal needs to switch to the base station B through the measurement feedback of the terminal. The base station A should check whether the application layer blockchain on-chaining auxiliary information is allowed to be sent to the base station B.

The base station A may obtain the identity of the destination cell on the base station B to which the terminal switches through the measurement on the terminal and obtain attribute information of the cell through inter-base station information interaction. The attribute information includes, for example, a TA of a cell, a TAI list, a supported operator, and a supported network slicing. According to the preceding information and the blockchain on-chaining range information in the application layer blockchain configuration information, the base station A determines whether the destination cell is within the range. If the destination cell is not within the range, the base station A does not send the configuration information of the blockchain to the base station B. If the destination cell is within the range, the base station A carries the configuration information of the blockchain in the handover request message sent to the base station B.

Without the preceding application layer blockchain on-chaining auxiliary information, the base station B cannot perform on-chaining service for the terminal application layer.

In S830, the base station B sends a handover request response message to the base station A.

In S840, the terminal accesses the base station B.

In S850, the terminal application layer triggers the reporting of blockchain information.

The blockchain information refers to the triggered terminal application layer information. When the trigger condition of the application layer blockchain configuration information is satisfied, the terminal application layer collects the terminal application layer information and triggers the reporting of the terminal application layer information.

If the application layer blockchain on-chaining auxiliary information stored by the terminal application layer before S810 contains an on-chaining encryption key, the terminal application layer encrypts the terminal application layer information and then reports the terminal application layer information.

In S860, the terminal application layer sends the terminal application layer information to the terminal AS layer.

In an embodiment, the terminal application layer information may be sent to the terminal AS layer through an AT command or a user plane connection.

In S870, the terminal AS layer sends the terminal application layer information to the base station B through an RRC connection.

In an embodiment, since the terminal is in the RRC connected state, the terminal application layer may send on-chaining data (that is, the terminal application layer information) to the base station B through the RRC connection. The terminal application layer may directly send the terminal application layer information to the base station B through an RRC control command, and the terminal application layer may also indicate to the base station that the terminal has data (that is, the terminal application layer information) that needs to be put on the blockchain through one or several bits. After the base station B receives the indication, the base station B acquires the terminal application layer information through a UE information request flow. The terminal application layer may also deliver the terminal application layer information to the base station B through a user plane.

In S880, the base station B puts the terminal application layer information on the blockchain.

In an embodiment, since the terminal is in the RRC connected state, the base station B stores user context of the terminal, and the context contains the application layer blockchain on-chaining auxiliary information. Therefore, the base station B sends the data to a blockchain server according to the configuration information of the application layer blockchain on-chaining auxiliary information.

In S890, the base station B sends an information on-chaining success indication to the blockchain service trigger server.

In an embodiment, after the on-chaining of the terminal application layer information succeeds, the base station B may send the information on-chaining success indication to the blockchain service trigger server.

In S8100, the blockchain service trigger server sends the information on-chaining success indication to the third-party server.

In an embodiment, after the third-party server receives the information on-chaining success indication, the third-party server may confirm that the operation of the terminal application has been put on the blockchain.

Figure 9:
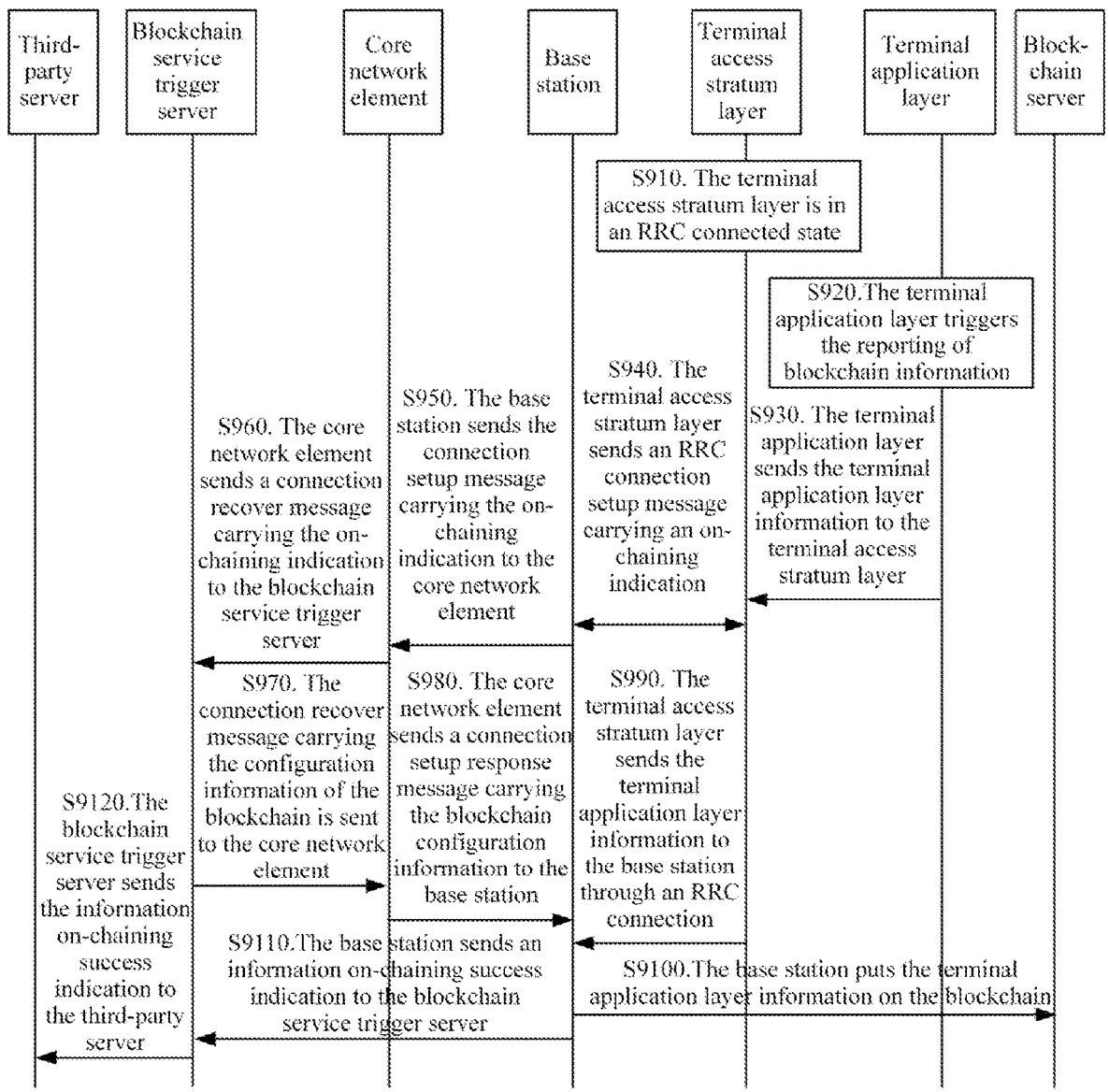
FIG. 9 is a flowchart of on-chaining of terminal application layer information when the terminal is in an RRC idle state according to an embodiment of the present application.

In an embodiment, FIG. 9 is a flowchart of on-chaining of terminal application layer information when the terminal is in an RRC idle state according to an embodiment of the present application. In this embodiment, the process of blockchain on-chaining of terminal application layer information is described below using an example where the first network element is a base station and the second network element is a blockchain service trigger server. As shown in FIG. 9, this embodiment includes S910 to S9120.

In S910, the terminal AS layer is in an RRC connected state.

In an embodiment, before S910, the terminal application layer stores application layer blockchain configuration information. Since the terminal is already in an RRC idle state, the terminal AS layer has deleted the application layer blockchain on-chaining auxiliary information.

In S920, the terminal application layer triggers the reporting of blockchain information.

The blockchain information refers to the triggered terminal application layer information. When the trigger condition of the application layer blockchain configuration information is satisfied, the terminal application layer collects the terminal application layer information and triggers the reporting of the terminal application layer information.

If the application layer blockchain on-chaining auxiliary information stored by the terminal application layer before S910 contains an on-chaining encryption key, the terminal application layer encrypts the terminal application layer information and then reports the terminal application layer information.

In S930, the terminal application layer sends the terminal application layer information to the terminal AS layer.

In an embodiment, the terminal application layer information may be sent to the terminal AS layer through an AT command or a user plane connection.

In S940, the terminal AS layer sends an RRC connection setup message carrying an on-chaining indication.

In an embodiment, since the terminal is in the RRC idle state, the terminal needs to trigger the RRC setup flow. In the RRC setup process, the on-chaining indication information is carried to the base station. The on-chaining indication information may be carried by an RRC message 5 or an RRC message 3. In an embodiment, the on-chaining indication includes one or a combination of the following information: a terminal identity, a blockchain on-chaining session identity, and an on-chaining indication (an idle state indication).

In S950, the base station sends the connection setup message carrying the on-chaining indication to the core network element.

In an embodiment, since the terminal is in the idle state, the base station does not store the application layer blockchain on-chaining auxiliary information of the terminal.

The purpose of S950 to S980 is to acquire the application layer blockchain on-chaining auxiliary information of the terminal. Since the blockchain service trigger server stores the application layer blockchain on-chaining auxiliary information of the terminal when the terminal is in the idle state, the base station is required to establish a connection to acquire the application layer blockchain on-chaining auxiliary information from the blockchain service trigger server.

In an embodiment, the base station sends a connection setup message such as an initialization UE message (denoted as INITIAL UE MESSAGE) of an NG interface or an S1 interface to the core network element to establish a connection between the base station and the core network element for the terminal. The connection setup message contains the on-chaining indication.

In S960, the core network element sends a connection recover message carrying the on-chaining indication to the blockchain service trigger server.

In S970, the connection recover message carrying the configuration information of the blockchain is sent to the core network element.

In S980, the core network element sends a connection setup response message carrying the configuration information of the blockchain to the base station.

In an embodiment, in S980, the configuration information of the terminal may also be sent to the base station using messages such as a UE context modification request.

In S990, the terminal AS layer sends the terminal application layer information to the base station through an RRC connection.

In an embodiment, since the terminal is in the RRC connected state, the terminal application layer may send on-chaining data (that is, the terminal application layer information) to the base station through the RRC connection. The terminal application layer may directly send the terminal application layer information to the base station B through an RRC control command, and the terminal application layer may also indicate to the base station that the terminal has data (that is, the terminal application layer information) that needs to be put on the blockchain through one or several bits. After the base station receives the indication, the base station acquires the terminal application layer information through a UE information request flow. The terminal application layer may also deliver the terminal application layer information to the base station through a user plane.

In S9100, the base station puts the terminal application layer information on the blockchain.

In an embodiment, since the terminal is in the RRC connected state, the base station stores user context of the terminal, and the context contains the application layer blockchain en-chaining auxiliary information. Therefore, the base station sends the data to a blockchain server according to the configuration information of the application layer blockchain on-chaining auxiliary information.

In S9110, the base station sends an information on-chaining success indication to the blockchain service trigger server.

In an embodiment, after the on-chaining of the terminal application layer information succeeds, the base station may send the information on-chaining success indication to the blockchain service trigger server.

In S9120, the blockchain service trigger server sends the information on-chaining success indication to the third-party server.

In an embodiment, after the third-party server receives the information on-chaining success indication, the third-party server may confirm that the operation of the terminal application has been put on blockchain.

Figure 10:
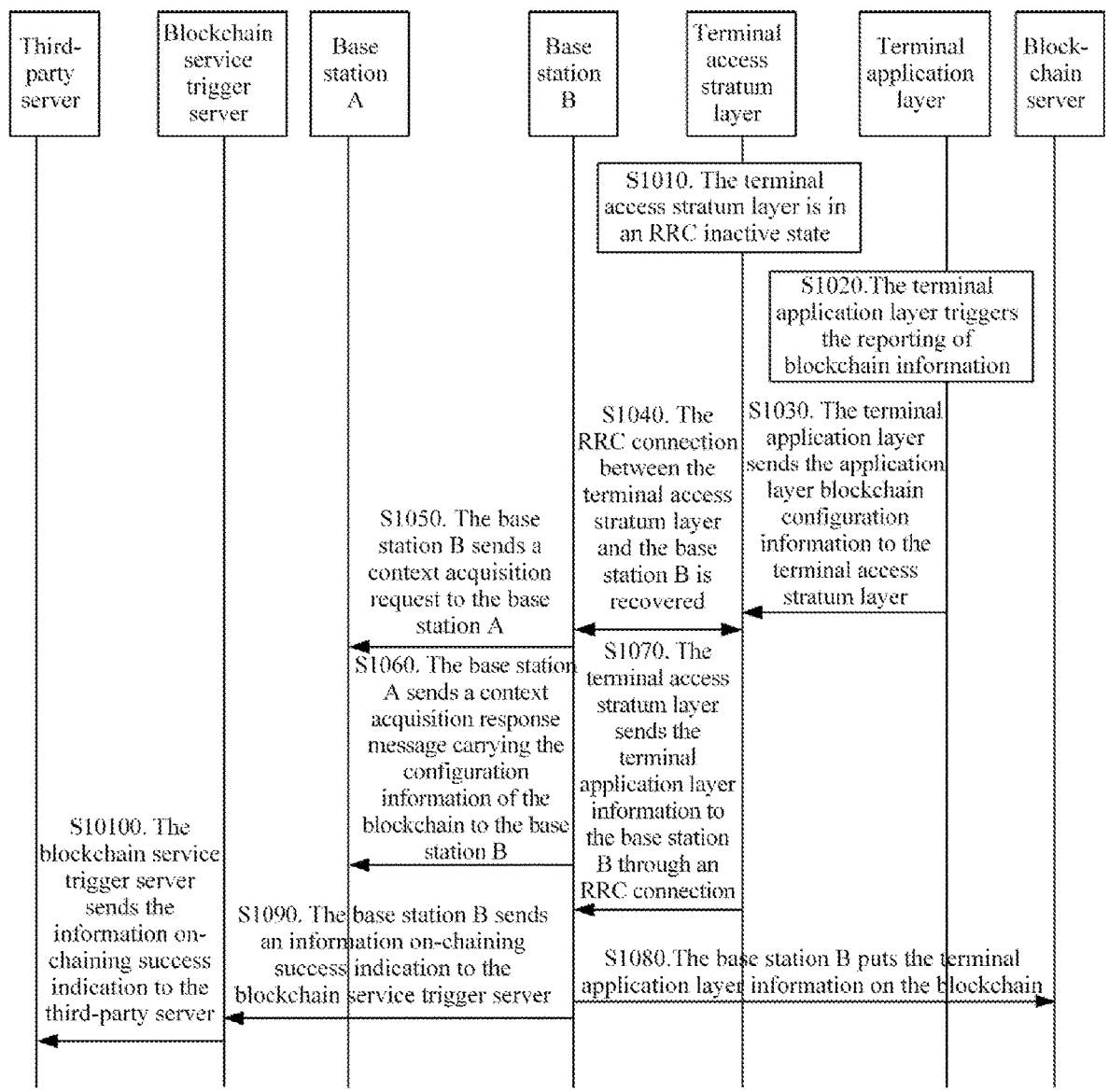
FIG. 10 is a flowchart of on-chaining of terminal application layer information when the terminal is in an RRC inactive state according to an embodiment of the present application.

In an embodiment, FIG. 10 is a flowchart of on-chaining of terminal application layer information when the terminal is in an RRC inactive state according to an embodiment of the present application. In this embodiment, the process of blockchain on-chaining of terminal application layer information is described below using an example where the first network element is a base station and the second network element is a blockchain service trigger server. As shown in FIG. 10, this embodiment includes S1010 to S10100.

In S1010, the terminal AS layer is in an RRC inactive state.

In an embodiment, before S1010, the terminal application layer stores application layer blockchain configuration information, and the terminal AS layer stores the application layer blockchain on-chaining auxiliary information.

Since the terminal serves the base station A before the terminal migrates to the RRC inactive state, the base station A stores the context information of the terminal, including the application layer blockchain configuration information of the terminal.

In S1020, the terminal application layer triggers the reporting of blockchain information.

The blockchain information refers to the triggered terminal application layer information. When the trigger condition of the application layer blockchain configuration information is satisfied, the terminal application layer collects the terminal application layer information and triggers the reporting of the terminal application layer information.

If the application layer blockchain on-chaining auxiliary information stored by the terminal application layer before S1010 contains an on-chaining encryption key, the terminal application layer encrypts the terminal application layer information and then reports the terminal application layer information.

In S1030, the terminal application layer sends the application layer blockchain configuration information to the terminal AS layer.

In an embodiment, the terminal application layer information may be sent to the terminal AS layer through an AT command or a user plane connection.

In S1040, the RRC connection between the terminal AS layer and the base station B is recovered.

In an embodiment, since the terminal is in the RRC inactive state, the terminal needs to trigger the RRC setup flow. In an embodiment, the terminal is in the coverage range of the base station B, and the RRC connection between the terminal AS layer and the base station B is recovered.

In S1050, the base station B sends a context acquisition request to the base station A.

In S1060, the base station A sends a context acquisition response message carrying the configuration information of the blockchain to the base station B.

In an embodiment, the base station A checks whether the base station B is within the terminal application on-chaining range. For the check operation, reference may be made to the description of S820, and details will not be repeated here.

In S10170, the terminal AS layer sends the terminal application layer information to the base station B through an RRC connection.

In an embodiment, since the terminal is in the RRC connected state, the terminal application layer may send on-chaining data (that is, the terminal application layer information) to the base station B through the RRC connection. The terminal application layer may directly send the terminal application layer information to the base station B through an RRC control command, and the terminal application layer may also indicate to the base station that the terminal has data (that is, the terminal application layer information) that needs to be put on blockchain through one or several bits. After the base station B receives the indication, the base station B acquires the terminal application layer information through a UE information request flow. The terminal application layer may also deliver the terminal application layer information to the base station B through a user plane.

In S1080, the base station B puts the terminal application layer information on the blockchain.

In an embodiment, since the terminal is in the RRC connected state, the base station B stores user context of the terminal, and the context contains the application layer blockchain on-chaining auxiliary information. Therefore, the base station B sends the data to a blockchain server according to the configuration information of the application layer blockchain on-chaining auxiliary information.

In S1090, the base station B sends an information on-chaining success indication to the blockchain service trigger server.

In an embodiment, after the on-chaining of the terminal application layer information succeeds, the base station B may send the information on-chaining success indication to the blockchain service trigger server.

In S10100, the blockchain service trigger server sends the information on-chaining success indication to the third-party server.

In an embodiment, after the third-party server receives the information on-chaining success indication, the third-party server may confirm that the operation of the terminal application has been put on blockchain.

Figure 11:
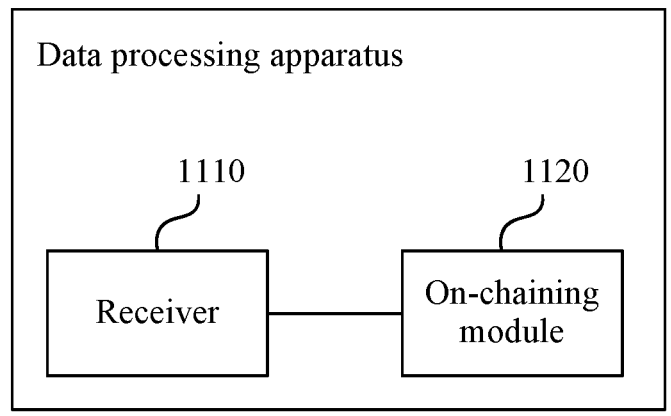
FIG. 11 is a block diagram of a data processing apparatus according to an embodiment of the present application.

In an embodiment, FIG. 11 is a block diagram of a data processing apparatus according to an embodiment of the present application. This embodiment is applied by a first network element. As shown in FIG. 11, the data processing apparatus in this embodiment includes a receiver 1110 and an on-chaining module 1120.

The receiver 1110 is configured to receive configuration information of a blockchain from a second network element, where the configuration information includes: application layer blockchain on-chaining auxiliary information, or application layer blockchain on-chaining auxiliary information and application layer blockchain configuration information.

The on-chaining module 1120 is configured to put terminal application layer information on the blockchain according to the application layer blockchain on-chaining auxiliary information.

In an embodiment, the data processing apparatus applied in the first network element further includes a generator and a first sender.

The generator is configured to generate data on-chaining success indication information.

The first sender is configured to send the information on-chaining success indication to a server that initiates a blockchain on-chaining session or a node that initiates a blockchain on-chaining session.

In an embodiment, the data processing apparatus applied in the first network element further includes a second sender.

The second sender is configured to send the application layer blockchain configuration information to a terminal application layer.

In an embodiment, the second network element includes one of the following: a blockchain service trigger server, a core network element, and a base station.

In an embodiment, the application layer blockchain configuration information is defined by a third-party server.

In an embodiment, the application layer blockchain on-chaining auxiliary information includes one or a combination of the following parameters:
  a blockchain application identity;
  a terminal application blockchain reporting range;
  a blockchain on-chaining session identity;
  a blockchain on-chaining format;
  a blockchain server IP address list and/or a blockchain node list;
  a correspondence between a blockchain server device identity or blockchain server address and on-chaining information;
  a server IP address that initiates a blockchain on-chaining session or a node that initiates the blockchain on-chaining session;
  an activation indication;
  a stop indication;
  a suspend indication;
  a recovery indication;
  an idle state indication; or
  terminal identification information.

In an embodiment, the terminal application blockchain reporting range includes one or a combination of the following parameters: a cell list, a TA list, a TAI list, a network slicing list, and an RAT type.

In an embodiment, the blockchain on-chaining format includes one or a combination of the following parameters: an information on-chaining frequency, an on-chaining information format, an on-chaining block size, and an on-chaining encryption key.

The data processing apparatus provided in this embodiment is configured to implement the data processing method applied by the first network element in the embodiment shown in FIG. 1. The implementation principles and effects of the data processing apparatus provided in this embodiment are similar to those of the method, and details will not be repeated here.

Figure 12:
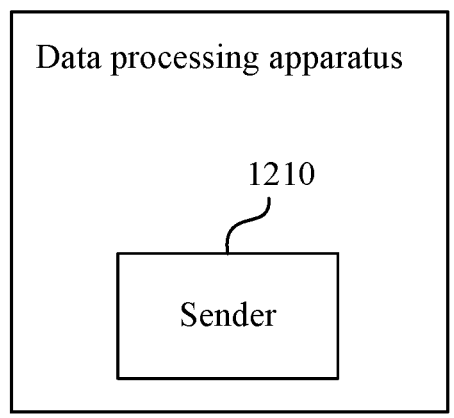
FIG. 12 is a block diagram of another data processing apparatus according to an embodiment of the present application.

In an embodiment, FIG. 12 is a block diagram of another data processing apparatus according to an embodiment of the present application. The embodiment is applied by a second network element. As shown in FIG. 12, the data processing apparatus in this embodiment includes a sender 1210.

The sender 1210 is configured to send configuration information of a blockchain to a first network element, where the configuration information includes: application layer blockchain on-chaining auxiliary information, or application layer blockchain on-chaining auxiliary information and application layer blockchain configuration information.

In an embodiment, the application layer blockchain on-chaining auxiliary information includes one or a combination of the following parameters: a blockchain application identity; a terminal application blockchain reporting range; a blockchain on-chaining session identity; a blockchain on-chaining format; a blockchain server IP address list and/or a blockchain node list; a correspondence between a blockchain server device identity or blockchain server address and on-chaining information; a server IP address that initiates a blockchain on-chaining session or a node that initiates the blockchain on-chaining session; an activation indication; a stop indication; a suspend indication; a recovery indication; an idle state indication; and terminal identification information.

The data processing apparatus provided in this embodiment is configured to implement the data processing method applied by the second network element in the embodiment shown in FIG. 2. The implementation principles and effects of the data processing apparatus provided in this embodiment are similar to those of the method, and details will not be repeated here.

Figure 13:
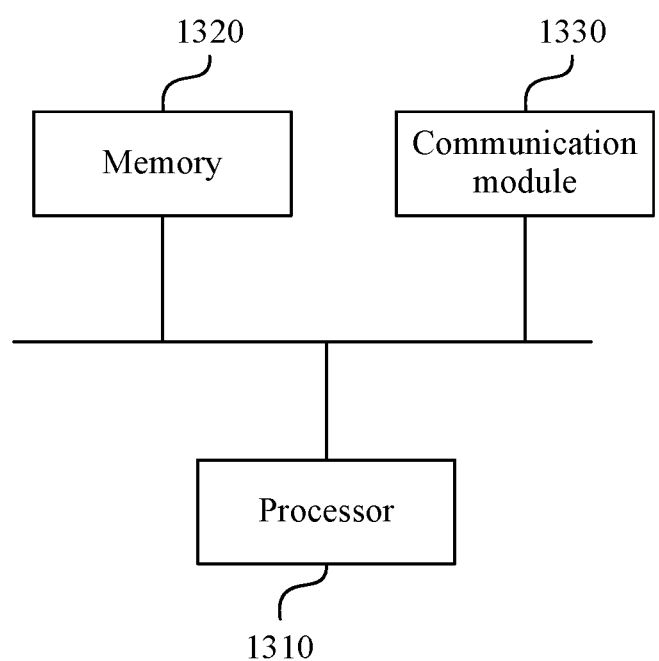
FIG. 13 is a structural diagram of a data processing device according to an embodiment of the present application.

FIG. 13 is a structural diagram of a data processing device according to an embodiment of the present application. As shown in FIG. 13, the device provided in this application includes a processor 1310, a memory 1320, and a communication module 1330. The number of processors 1310 in the device may be one or more, and one processor 1310 is illustrated as an example in FIG. 13. The number of memories 1320 in the device may be one or more, and one memory 1320 is illustrated as an example in FIG. 13. The processor 1310, the memory 1320 and the communication module 1330 in the device may be connected via a bus or in other manners, and the connection via the bus is illustrated as an example in FIG. 13. In this embodiment, the device may be a first network element.

As a computer-readable storage medium, the memory 1320 may be configured to store software programs and computer-executable programs and modules such as program instructions/modules (for example, the receiver and the on-chaining module in the data processing apparatus) corresponding to the device in any one of the embodiments of the present application. The memory 1320 may include a program storage region and a data storage region. The program storage region may store an operating system and an application program required by at least one function, and the data storage region may store data created depending on the use of the device. In addition, the memory 1320 may include a high-speed random-access memory and may also include a non-volatile memory such as at least one disk memory, flash memory or another non-volatile solid-state memory. In some examples, the memory 1320 may further include memories located remotely relative to the processor 1310, and these remote memories may be connected to the equipment via a network. Examples of the preceding network include, but are not limited to, the Internet, an intranet, a local area network, a mobile communication network, and a combination thereof.

The communication module 1330 is configured to perform communication interaction among nodes.

In a case where the data processing device is a first network element, the device provided above may be configured to execute the data processing method applied by the first network element in any one of the preceding embodiments and has corresponding functions and effects.

In a case where the data processing device is a second network element, the device provided above may be configured to execute the data processing method applied by the second network element in any one of the preceding embodiments and has corresponding functions and effects.

The embodiments of the present application further provide a storage medium including computer-executable instructions. The computer-executable instructions, when executed by a computer processor, are used for executing the data processing method applied by the first network element, and the method includes: configuration information of a blockchain is received from a second network element, where the configuration information includes: application layer blockchain on-chaining auxiliary information, or application layer blockchain on-chaining auxiliary information and application layer blockchain configuration information; and terminal application layer information is put on the blockchain according to the application layer blockchain on-chaining auxiliary information.

The embodiments of the present application further provide a storage medium including computer-executable instructions. The computer-executable instructions, when executed by a computer processor, are used for executing the data processing method applied by the second network element, and the method includes: configuration information of a blockchain is sent to a first network element, where the configuration information includes: application layer blockchain on-chaining auxiliary information, or application layer blockchain on-chaining auxiliary information and application layer blockchain configuration information.

The storage medium may be a non-transitory storage medium.

It is to be understood by those skilled in the art that the term "user equipment" covers any suitable type of wireless user device, for example, a mobile phone, a portable data processing apparatus, a portable web browser or a vehicle-mounted mobile station.

In general, multiple embodiments of the present application may be implemented in hardware or special-purpose circuits, software, logic, or any combination thereof. For example, some aspects may be implemented in hardware, while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, such as in a processor entity, or by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions or may represent a combination of program steps with logic circuits, modules, and functions. A computer program may be stored in a memory. The memory may be of any type suitable for a local technical environment and may be implemented using any suitable data storage technology, such as, but not limited to, a read-only memory (ROM), a random-access memory (RAM), and an optical memory device and system (digital video disc (DVD) or compact disk (CD)). The computer-readable media may include a non-transitory storage medium. The data processor may be of any type suitable to the local technical environment, and for example, includes, but is not limited to, a general-purpose computer, a special-purpose computer, a microprocessor, a digital signal processing (DSP), an application-specific integrated circuit (ASIC), a field-programmable gate array (FPGA), and a processor based on a multi-core processor architecture.

The preceding are only some embodiments of the present application and are not intended to limit the present application. For those skilled in the art, the present application may have various modifications and variations. Any modifications, equivalent substitutions, improvements and the like within the spirit and principle of the present application are within the scope of the present application.

What is claimed is:

1. A data processing method, applied by a first network element and comprising:
   receiving configuration information of a blockchain from a second network element, wherein the configuration information comprises application layer blockchain on-chaining auxiliary information or the configuration information comprises application layer blockchain on-chaining auxiliary information and application layer blockchain configuration information, the first network element comprises one of the following: a base station, a blockchain service trigger server, and a core network element, the second network element comprises one of the following: the second network element comprises one of the following: a blockchain service trigger server, a core network element, and a base station, and the first network element and the second network element are not the same network element; and
   collecting terminal application layer information according to the application layer blockchain on-chaining auxiliary information and putting the collected terminal application layer information on the blockchain, wherein the terminal application layer information refers to measurement data information;

wherein the application layer blockchain on-chaining auxiliary information comprises one or a combination of the following parameters:
a blockchain application identity;
a terminal application blockchain reporting range;
a blockchain on-chaining session identity;
a blockchain on-chaining format;
a blockchain server Internet Protocol (IP) address list and/or a blockchain node list;
a correspondence between a blockchain server device identity and on-chaining information or a correspondence between a blockchain server address and on-chaining information;
a server IP address that initiates a blockchain on-chaining session or a node that initiates the blockchain on-chaining session;
an activation indication;
a stop indication;
a suspend indication;
a recovery indication; and
an idle state indication.

2. The method of claim 1, further comprising:
generating an information on-chaining success indication; and
sending the information on-chaining success indication to a server that initiates a blockchain on-chaining session or a node that initiates a blockchain on-chaining session.

3. The method of claim 2, wherein the application layer blockchain configuration information is defined by a third-party server.

4. The method of claim 1, further comprising:
sending the application layer blockchain configuration information to a terminal application layer.

5. The method of claim 4, wherein the application layer blockchain configuration information is defined by a third-party server.

6. The method of claim 1, wherein the application layer blockchain configuration information is defined by a third-party server.

7. The method of claim 1, wherein the terminal application blockchain reporting range comprises one or a combination of the following parameters: a cell list, a tracking area (TA) list, a tracking area identity (TAI) list, a network slicing list, and a radio access technology type.

8. The method of claim 1, wherein the blockchain on-chaining format comprises one or a combination of the following parameters: an information on-chaining frequency, an on-chaining information format, an on-chaining block size, and an on-chaining encryption key.

9. A non-transitory storage medium storing a computer program, wherein the computer program, when executed by a processor, implements the method of claim 1.

10. A data processing method, applied by a second network element and comprising:
sending configuration information of a blockchain to a first network element, wherein the configuration information comprises application layer blockchain on-chaining auxiliary information or the configuration information comprises application layer blockchain on-chaining auxiliary information and application layer blockchain configuration information, the first network element comprises one of the following: a base station, a blockchain service trigger server, and a core network element, the second network element comprises one of the following: the second network element comprises one of the following: a blockchain service trigger server, a core network element, and a base station, and the first network element and the second network element are not the same network element;
wherein, the application layer blockchain on-chaining auxiliary information is used to instruct the first network element to collect terminal application layer information according to the application layer blockchain on-chaining auxiliary information, and put the collected terminal application layer information on the blockchain; the terminal application layer information refers to measurement data information;
wherein the application layer blockchain on-chaining auxiliary information comprises one or a combination of the following parameters:
a blockchain application identity;
a terminal application blockchain reporting range;
a blockchain on-chaining session identity:
a blockchain on-chaining format;
a blockchain server Internet Protocol (IP) address list and/or a blockchain node list;
a correspondence between a blockchain server device identity and on-chaining information or a correspondence between a blockchain server address and on-chaining information;
a server IP address that initiates a blockchain on-chaining session or a node that initiates the blockchain on-chaining session;
an activation indication;
a stop indication;
a suspend indication;
a recovery indication; and
an idle state indication.

11. A second network element, comprising a communication module, a memory, and one or more processors;
wherein the communication module is configured to perform communication interaction among a plurality of nodes;
the memory is configured to store one or more programs; and
when the one or more programs, when executed by the one or more processors, enable the one or more processors to implement the method of claim 10.

12. A non-transitory storage medium storing a computer program, wherein the computer program, when executed by a processor, implements the method of claim 10.

13. A first network element, comprising a communication module, a memory, and one or more processors;
wherein the communication module is configured to perform communication interaction among a plurality of nodes;
the memory is configured to store one or more programs; and
when the one or more programs, when executed by the one or more processors, enable the one or more processors to implement:
receiving configuration information of a blockchain from a second network element, wherein the configuration information comprises application layer blockchain on-chaining auxiliary information or the configuration information comprises application layer blockchain on-chaining auxiliary information and application layer blockchain configuration information, the first network element comprises one of the following: a base station, a blockchain service trigger server, and a core network element, the second network element comprises one of the following: the second network element comprises one of the following: a blockchain service trigger server, a core network element, and a base station, and the first network element and the second network element are not the same network element; and collecting terminal application layer information according to the application layer blockchain on-chaining auxiliary information and putting the collected terminal application layer information on the blockchain, wherein the terminal application layer information refers to measurement data information;

wherein the application layer blockchain on-chaining auxiliary information comprises one or a combination of the following parameters:

a blockchain application identity;
a terminal application blockchain reporting range;
a blockchain on-chaining session identity;
a blockchain on-chaining format;
a blockchain server Internet Protocol (IP) address list and/or a blockchain node list;
a correspondence between a blockchain server device identity and on-chaining information or a correspondence between a blockchain server address and on-chaining information;
a server IP address that initiates a blockchain on-chaining session or a node that initiates the blockchain on-chaining session;
an activation indication;
a stop indication;
a suspend indication;
a recovery indication; and
an idle state indication.

\* \* \* \* \*